United States Patent
Inoue et al.

(10) Patent No.: US 9,021,788 B2
(45) Date of Patent: *May 5, 2015

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Susono (JP); Kazuhiro Umemoto, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/375,674

(22) PCT Filed: Apr. 15, 2011

(86) PCT No.: PCT/JP2011/059880
§ 371 (c)(1), (2), (4) Date: Dec. 1, 2011

(87) PCT Pub. No.: WO2012/140784
PCT Pub. Date: Oct. 18, 2012

(65) Prior Publication Data
US 2014/0030160 A1    Jan. 30, 2014

(51) Int. Cl.
*F01N 3/10* (2006.01)
*F01N 3/00* (2006.01)
(Continued)

(52) U.S. Cl.
CPC ............ *B01D 53/9431* (2013.01); *F01N 3/206* (2013.01); *F01N 3/035* (2013.01); *F01N 2570/14* (2013.01); *F01N 2610/03* (2013.01)

(58) Field of Classification Search
None
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

U.S. Appl. No. 13/582,862, filed Sep. 5, 2012 in the name of Uenishi et al.

(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. At the time of engine operation, the amplitude of change of the concentration of hydrocarbons which flow into the exhaust purification catalyst (13) is made to become within a predetermined range of amplitude by control of the injection amount of hydrocarbons from the hydrocarbon feed valve (15), the concentration of hydrocarbons flowing into the exhaust purification catalyst (13) is made to vibrate by a predetermined range of period by control of the injection period of hydrocarbons from the hydrocarbon feed valve (15), and thereby the $NO_x$ contained in the exhaust gas and the $NO_x$ stored in the exhaust purification catalyst (13) are reduced.

11 Claims, 21 Drawing Sheets

(51) Int. Cl.
*F01N 9/00* (2006.01)
*B01D 53/94* (2006.01)
*F01N 3/20* (2006.01)
*F01N 3/035* (2006.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 * | 8/2006 | Dalla Betta et al. ............ 60/286 |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ................ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 * | 4/2009 | Tsujimoto et al. .............. 60/299 |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |

(56) References Cited

FOREIGN PATENT DOCUMENTS

| JP | A-2005-171853 | 6/2005 |
|---|---|---|
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

U.S. Appl. No. 13/264,594, filed Oct. 14, 2011 in the name of Inoue et al.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Dec. 27, 2011 International Search Report issued in International Patent Application No. PCT/JP2011/075618. (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303. (with translation).
Mar. 15, 2011 International Search Report issued in International Patent Application No. PCT/JP2011/053429. (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/257,789 in the name of Nishioka et al., filed on Oct. 14, 2011.
U.S. Appl. No. 13/258,483 in the name of Numata et al., filed Sep. 22, 2011.
U.S. Appl. No. 13/259,574 in the name of Tsukamoto et al,, filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,884 in the name of Bisaiji et al., filed Oct. 17, 2011.
U.S. Appl. No. 13/578,148 in the name of Umemoto et al., filed Aug. 9, 2012.

(56) References Cited

OTHER PUBLICATIONS

U.S. Appl. No. 13/58,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,909 in the name of Kazuhiro Umemoto et al., filed Sep. 5, 2012.
U.S. Appl. No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 21, 2011 International Search Report issued in International Patent Application No. PCT/JP2011/059880 (with translation).
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed on Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2, 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Office Action dated Mar. 28, 2014 issued in U.S. Appl. No. 13/582,862.
Dec. 22, 2014 Office Action issued in U.S. Appl. No. 13/264,230.

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein a hydrocarbon feed valve for feeding hydrocarbons is arranged inside of an engine exhaust passage, an exhaust purification catalyst for reacting $NO_x$ contained in exhaust gas and reformed hydrocarbons is arranged inside of the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, when $NO_x$ is stored in the exhaust purification catalyst, an injection amount of hydrocarbons from the hydrocarbon feed valve is controlled so that the amplitude of the change of concentration of hydrocarbons flowing into the exhaust purification catalyst becomes within the predetermined range of amplitude, and an injection period of hydrocarbons from the hydrocarbon feed valve is controlled so that the concentration of hydrocarbons flowing into the exhaust purification catalyst vibrates by the predetermined range of period, thereby the $NO_x$ which is contained in the exhaust gas and the $NO_x$ which is stored in the exhaust purification catalyst are reduced.

Advantageous Effects of Invention

It is possible to obtain a high $NO_x$ purification rate even if the temperature of the exhaust purification catalyst becomes a high temperature.

DESCRIPTION OF EMBODIMENTS

Figure 1:
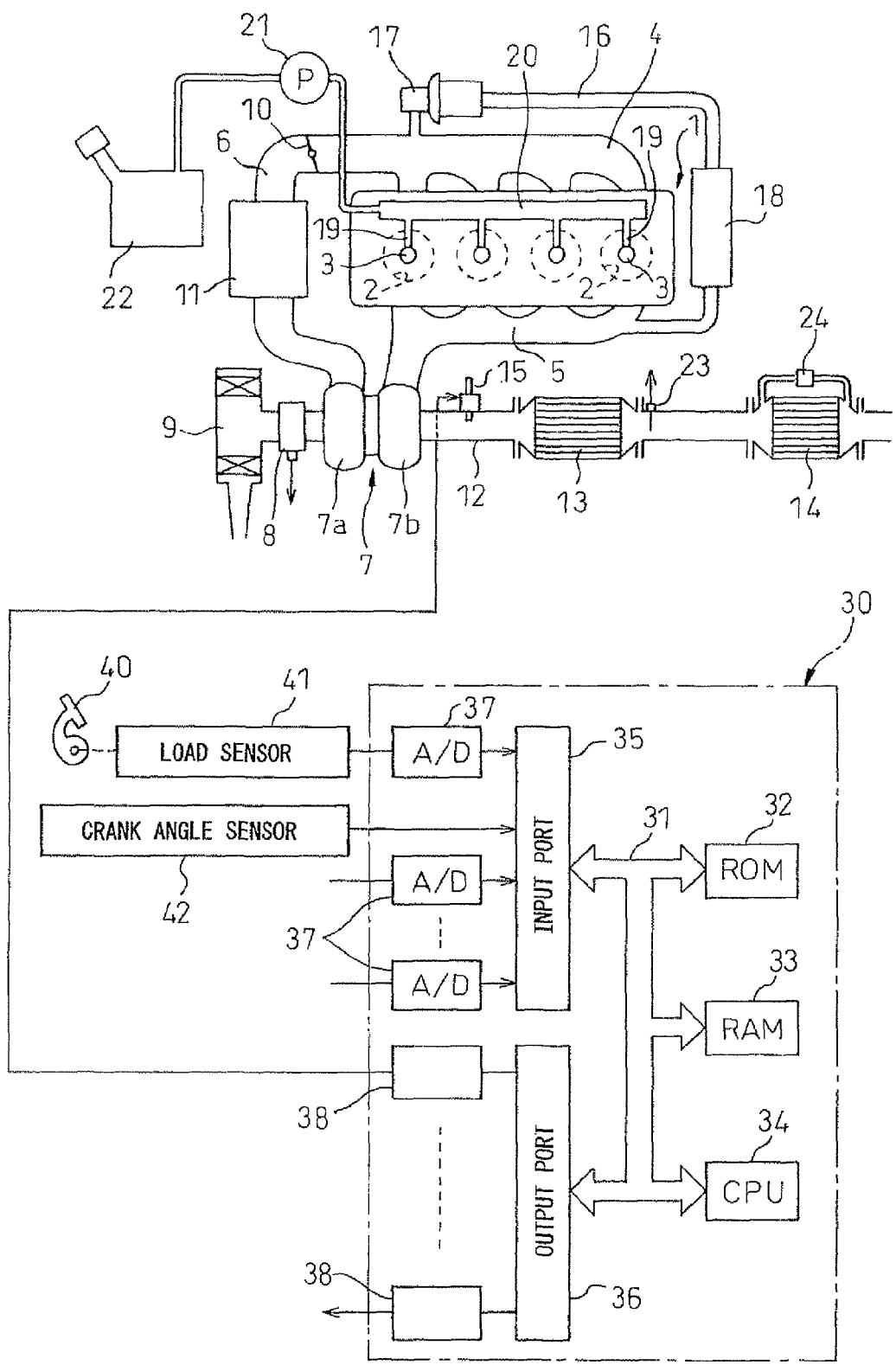
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of the exhaust purification catalyst 13, while an outlet of the exhaust purification catalyst 13 is connected to a particulate filter 14 for trapping particulate which is contained in the exhaust gas. Inside of an exhaust pipe 12 upstream of the exhaust purification catalyst 13, a hydrocarbon feed valve 15 is arranged for feeding the diesel oil or other fuel which is used as the fuel of the compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting the temperature of the exhaust purification catalyst 13 is attached. At the particulate filter 14, a differential pressure sensor 24 for detecting a differential pressure before and after the particulate filter 14 is attached. The output signals of these temperature sensor 23, differential pressure sensor 24, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
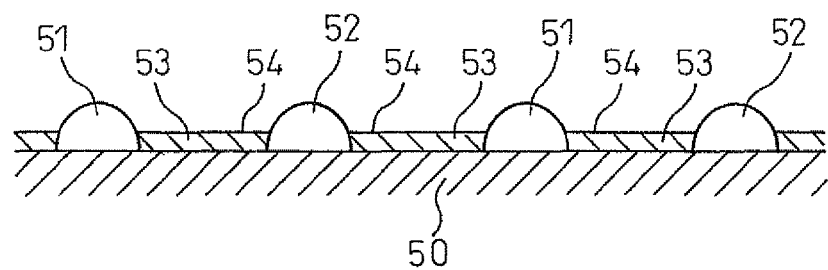
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
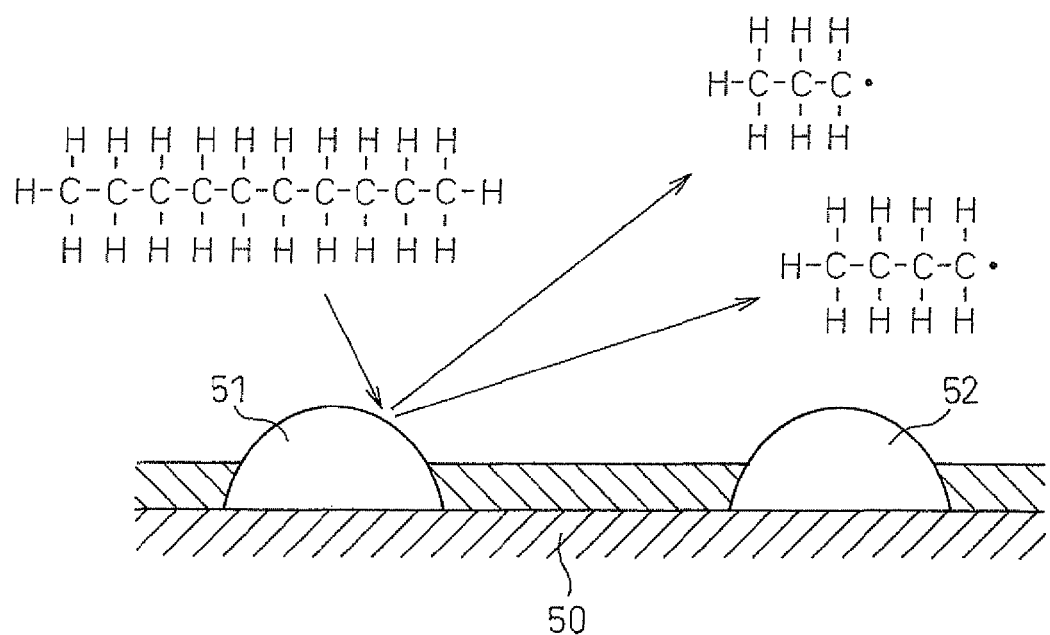
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
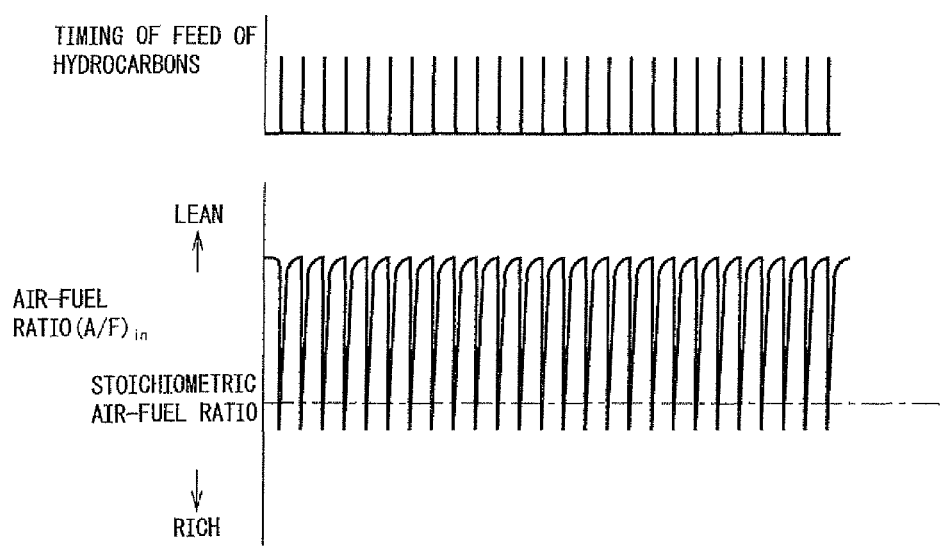
FIG. 4 is a view showing a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
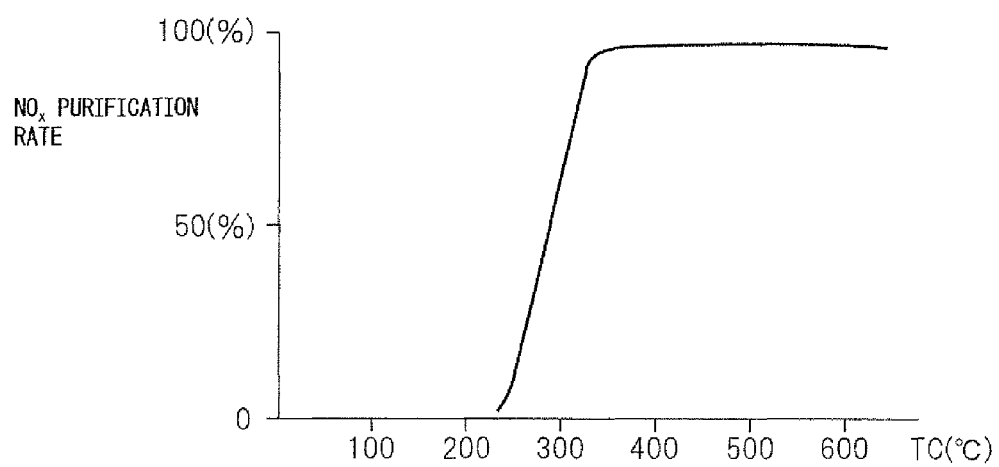
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
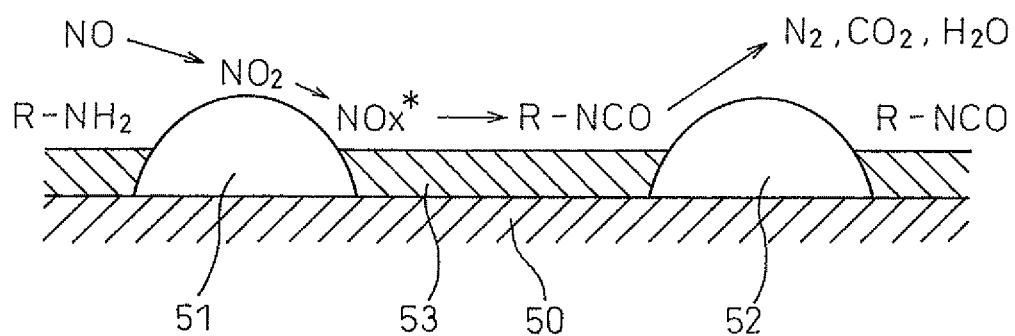
FIGS. 6A and 6B are views for explaining an oxidation reduction reaction in an exhaust purification catalyst.
Figure 6B:
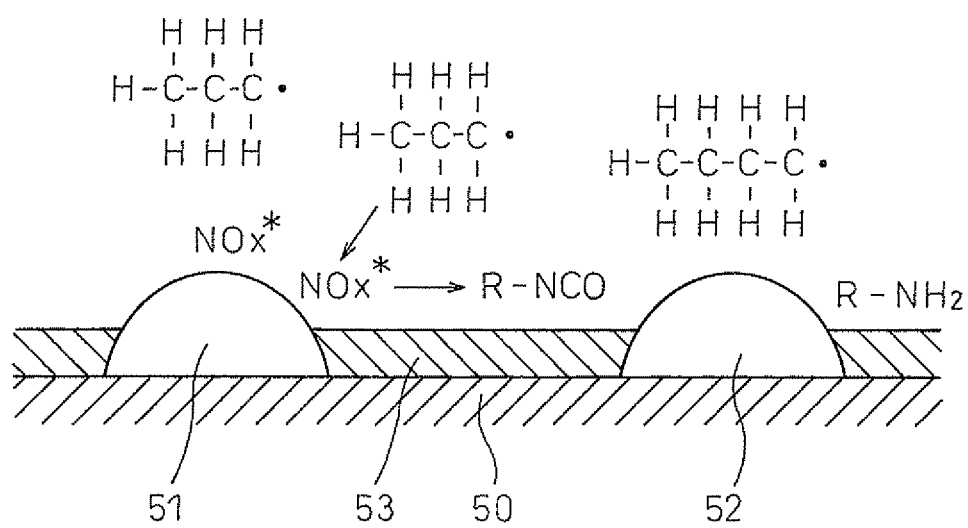

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amino compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ react. At this time, the active $NO_x^*$ reacts with the reducing intermediate R—NCO or R—$NH_2$ to become $N_2$, $CO_2$, $H_2O$, therefore the $NO_x$ is removed.

In this way, in the exhaust purification catalyst 13, by making the concentration of hydrocarbons flowing into the exhaust purification catalyst 13 higher, a reducing intermediate is produced. The concentration of hydrocarbons flowing into the exhaust purification catalyst 13 is lowered and the oxygen concentration is raised so that the active $NO_x^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x^*$. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 24, until the produced reducing intermediate reacts with the active $NO_x^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_x^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. No is reduced by the reducing action of the reducing intermediate R—NCO or R—$NH_2$ held on the basic exhaust gas flow surface part 54, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
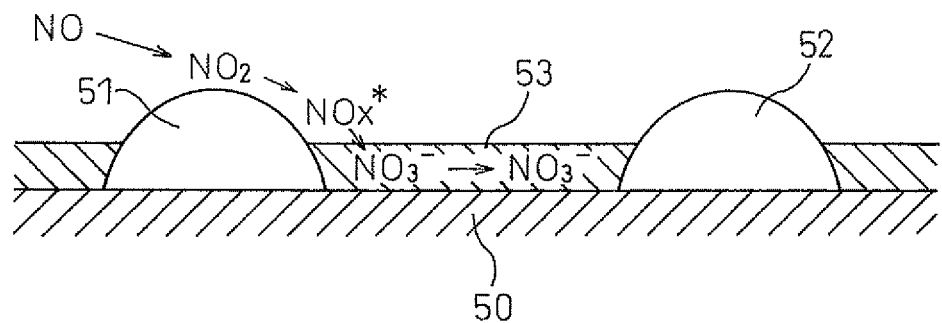
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
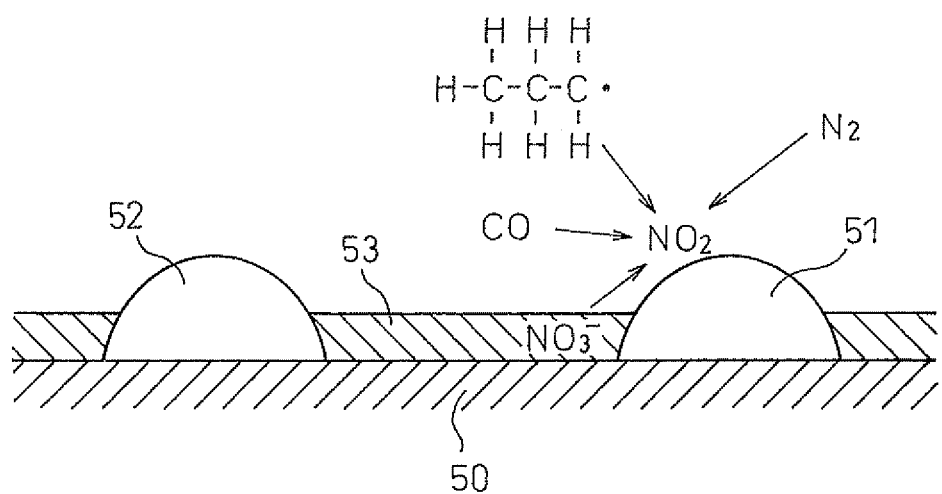

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
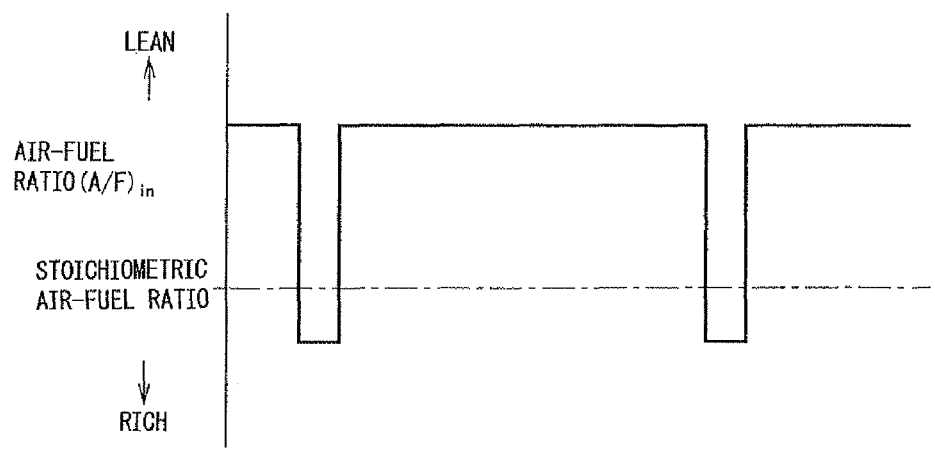
FIG. 8 is a view schematically showing a change of an air-fuel ratio of exhaust gas flowing into an exhaust purification catalyst.

FIG. 8 schematically shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
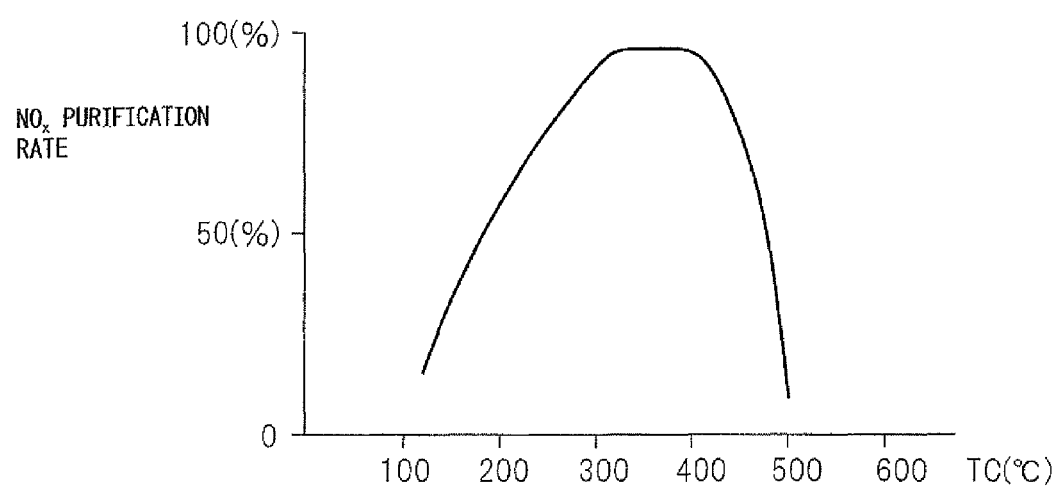
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for reacting $NO_x$ contained in exhaust gas and reformed hydrocarbons is arranged in the engine exhaust passage downstream of the hydrocarbon feed valve 15, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons flowing into the exhaust purification catalyst 13 is made to vibrate within a predetermined range of amplitude and within a predetermined range of period and has the property of being increased in storage amount of $NO_x$ which is contained in exhaust gas increasing if the vibration period of the hydrocarbon concentration is made longer than this predetermined range, and, at the time of engine operation, the concentration of hydrocarbons flowing into the exhaust purification catalyst 13 is made to vibrate within the predetermined range of amplitude and with the predetermined range of period to thereby reduce the $NO_x$ which is contained in the exhaust gas in the exhaust purification catalyst 13.

That is, the $NO_x$ purification method which is shown from FIG. 4 to FIGS. 6A and 68 can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
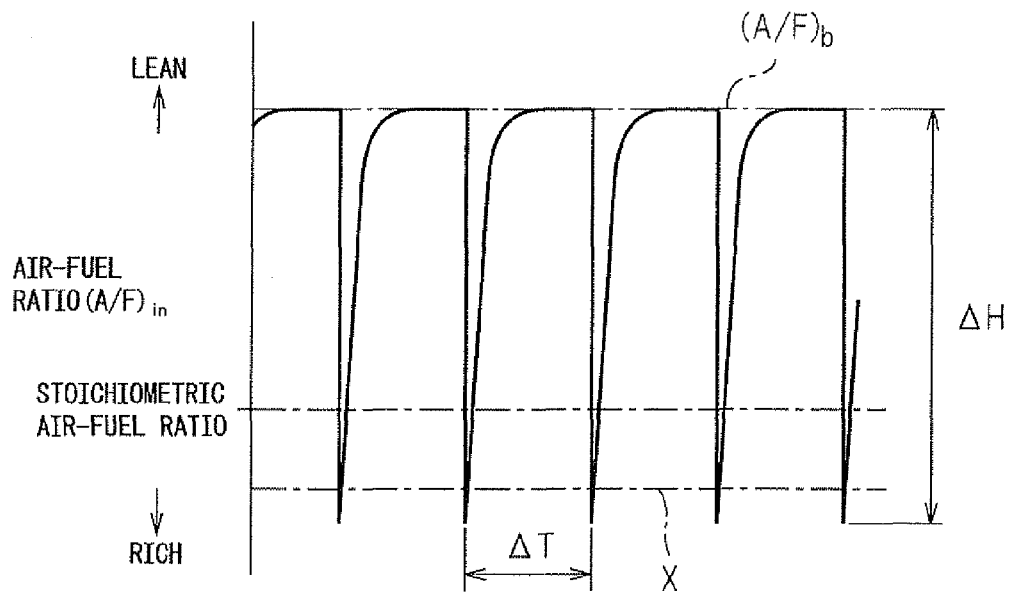
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediate without the produced active $NO_x^*$ being stored in the form of nitrates inside the basic layer 53 much at all. To make the active $NO_x^*$ and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_x^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
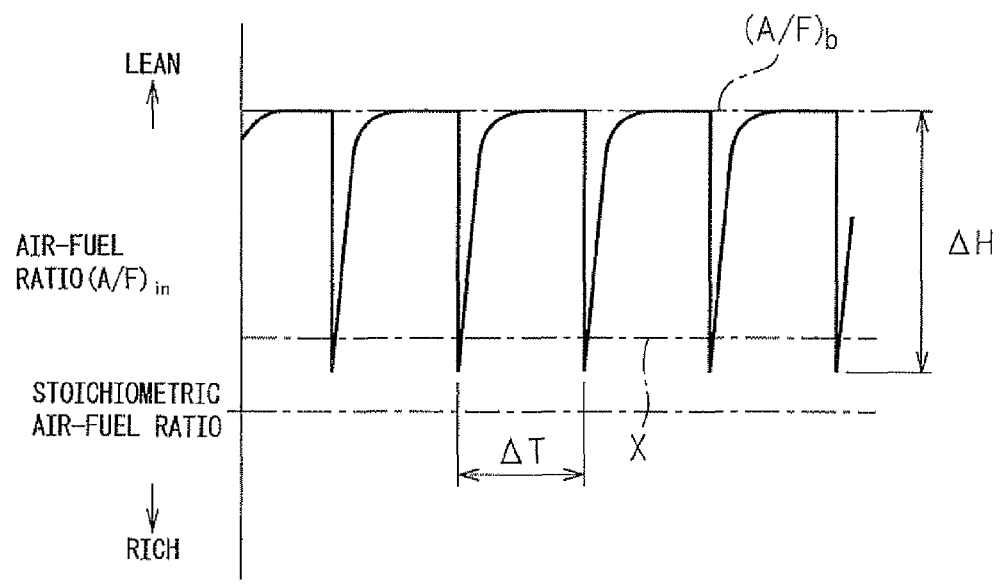
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
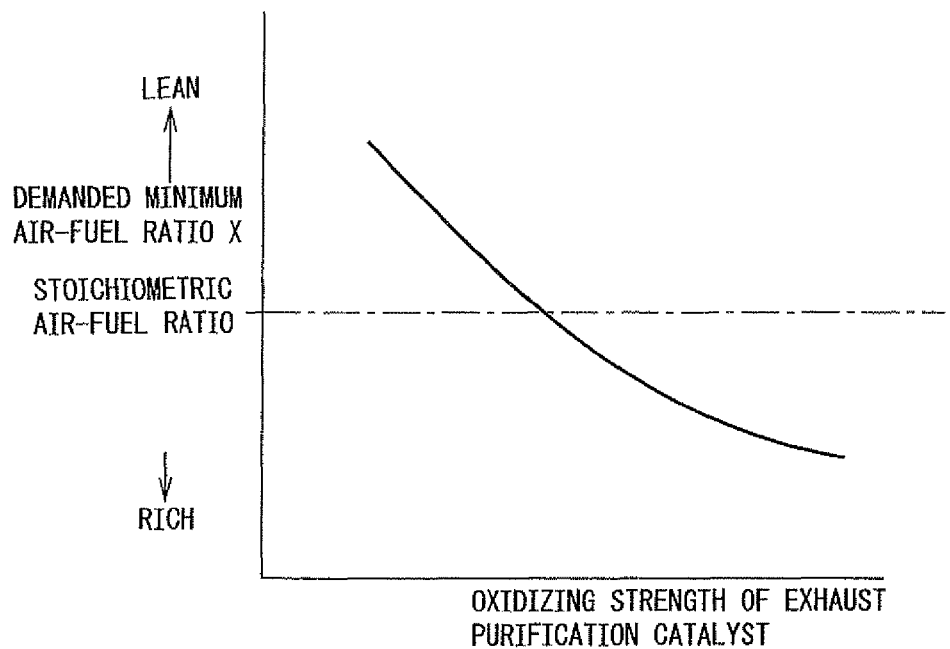
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
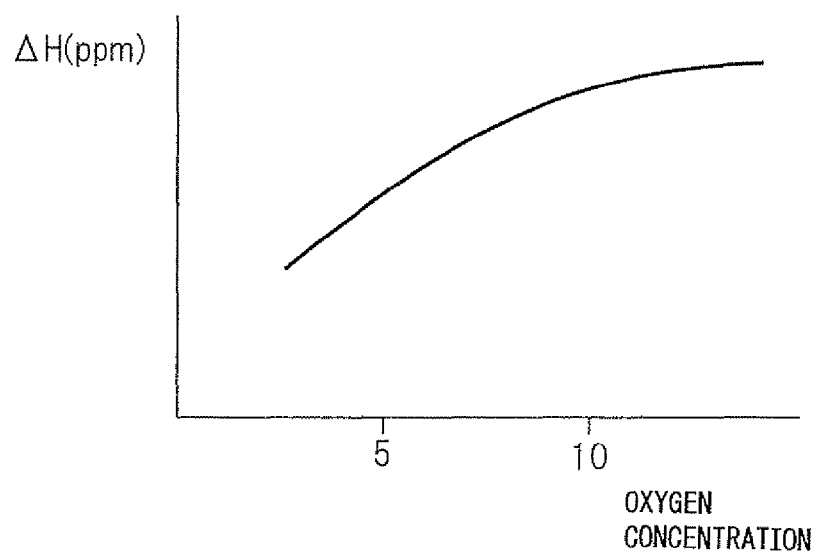
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
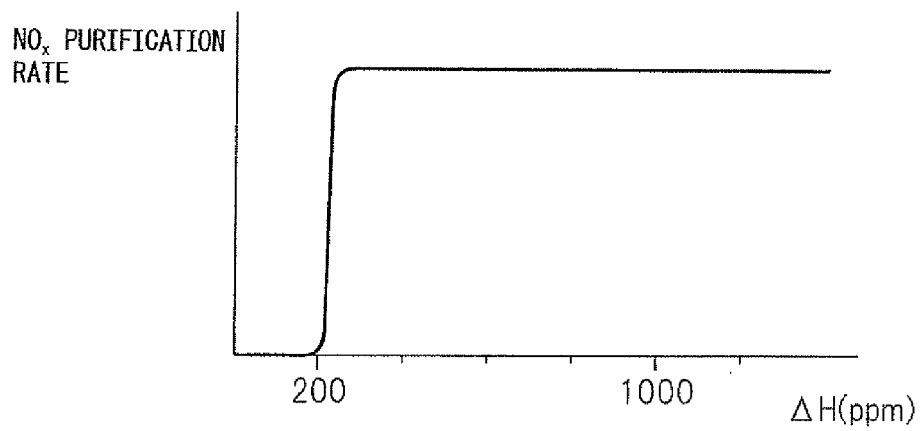
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
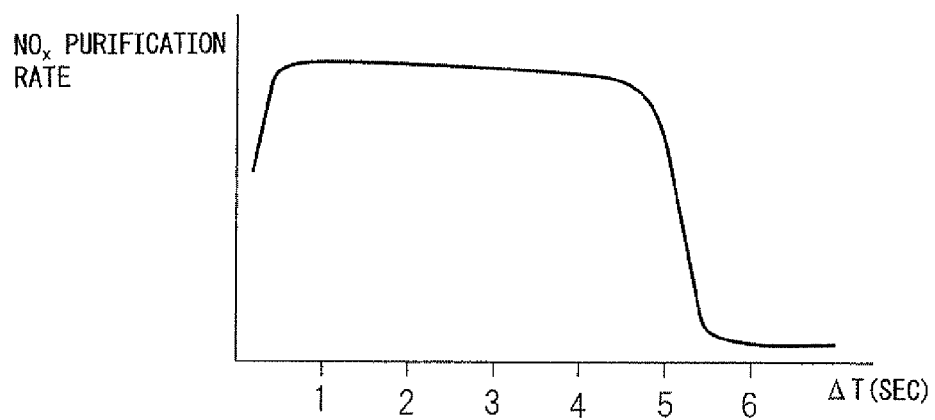
FIG. 15 is a view showing a relationship of a vibration period ΔT of a hydrocarbon concentration and an $NO_x$ purification rate.

Further, if the vibration period $\Delta T$ of the hydrocarbon concentration becomes longer, the oxygen concentration around the active $NO_x^*$ becomes higher in the time after the hydrocarbons are fed to when the hydrocarbons are next fed. In this case, if the vibration period $\Delta T$ of the hydrocarbon concentration becomes longer than about 5 seconds, the majority of the active $NO_x^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, referring to FIG. 16 to FIG. 19, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 16:
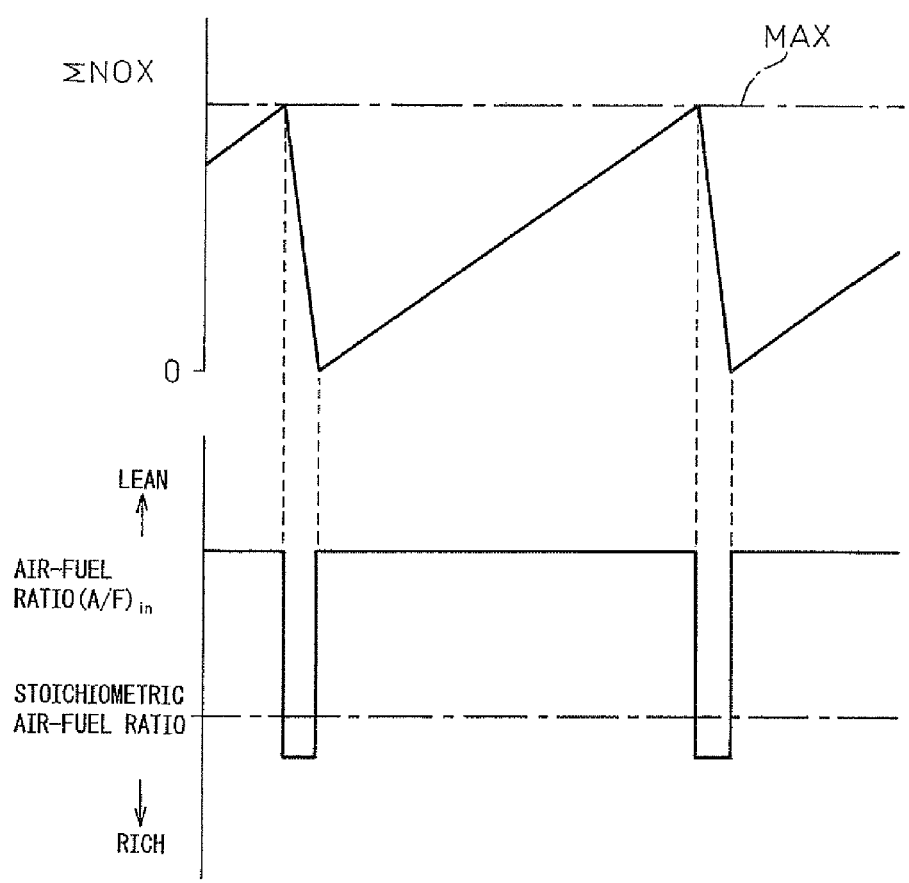
FIG. 16 is a view schematically showing a change in the air-fuel ratio of the exhaust gas flowing to the exhaust purification catalyst etc.

In this second $NO_x$ purification method, as schematically shown in FIG. 16, when the stored $NO_x$ amount $\Sigma NOX$ of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 17:
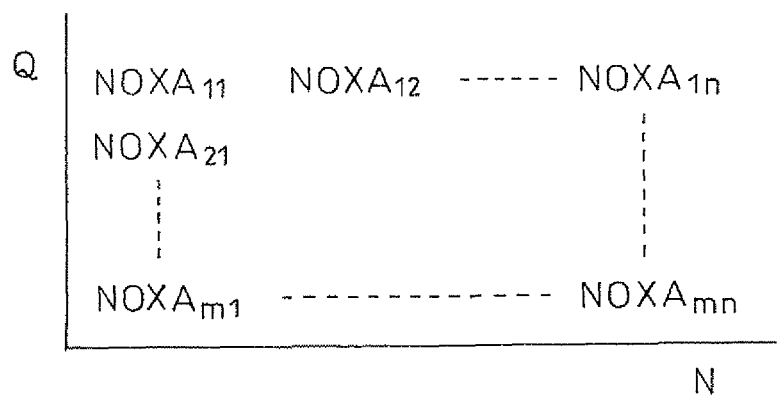
FIG. 17 is a view showing a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount $\Sigma NOX$ is calculated from exhausted $NO_x$ amount NOXA. In this case, as explained before, the period during which the air-fuel ratio (A/F)in of the exhaust gas is made rich is usually 1 minute or more.

Figure 18:
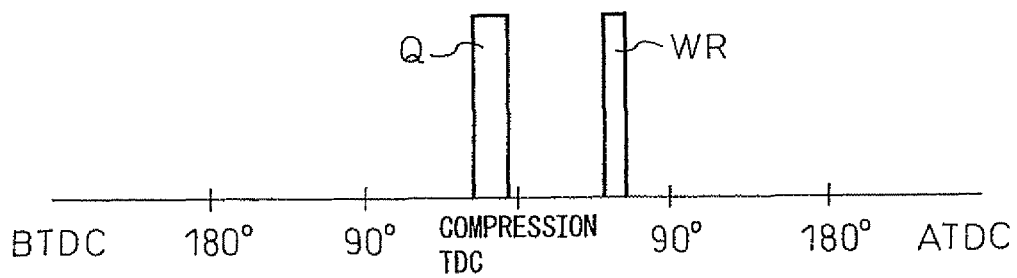
FIG. 18 is a view showing a fuel injection timing.
Figure 19:
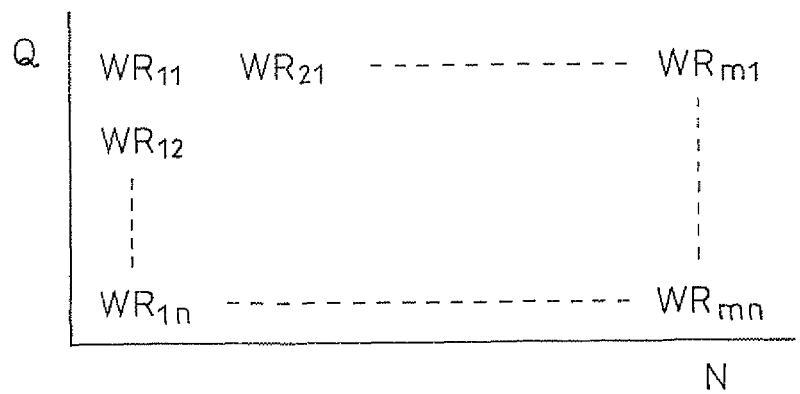
FIG. 19 is a view showing a map of a hydrocarbon feed amount WR.

In this second $NO_x$ purification method, as shown in FIG. 18, the fuel injector 3 injects additional fuel WR into the combustion chamber 2 in addition to the combustion-use fuel Q so that the air-fuel ratio (A/F)in of the exhaust gas flowing into the exhaust purification catalyst 13 is made rich. Note that, FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to make the amount of feed of hydrocarbons from the hydrocarbon feed valve 15 increase so as to make the air-fuel ratio (A/F)in of the exhaust gas rich.

Now, returning again to the explanation of the first $NO_x$ purification method, to use the first $NO_x$ purification method to remove the $NO_x$ well as explained before, the amplitude $\Delta H$ and vibration period $\Delta T$ of the hydrocarbon concentration have to be suitably controlled. That is, to use the first $NO_x$ purification method to remove the $NO_x$ well, the air-fuel ratio (A/F)in of the exhaust gas which flows into the exhaust purification catalyst 13 has to be made the demanded minimum air-fuel ratio X or less by control of the amplitude $\Delta H$ of the hydrocarbon concentration and the vibration period $\Delta T$ of the hydrocarbon concentration has to be controlled to 0.3 second to 5 seconds.

In this case, in the present invention, the vibration period $\Delta T$ of the hydrocarbon concentration is controlled by controlling the injection amount of hydrocarbons from the hydrocarbon feed valve 15 and the vibration period $\Delta T$ of the hydrocarbon concentration is controlled by controlling the injection period of hydrocarbons from the hydrocarbon feed valve 15. Note that in this case, the injection amount of hydrocarbons from the hydrocarbon feed valve 15 is controlled by controlling at least one of the injection time or injection pressure of hydrocarbons from the hydrocarbon feed valve 15.

In this regard, when the first $NO_x$ purification method is used for an $NO_x$ purification action, what is most demanded is that it be able to obtain the highest $NO_x$ purification rate no matter what the operating state and that the fed hydrocarbons not pass straight through the exhaust purification catalyst 13. The inventors repeatedly studied this point and as a result learned that in the exhaust purification catalyst 13, the amount of completely oxidized hydrocarbons and the amount of partially oxidized hydrocarbons govern the $NO_x$ purification rate and the amount of hydrocarbons passing straight through. Next, this will be explained with reference to FIG. 20.

Figure 20:
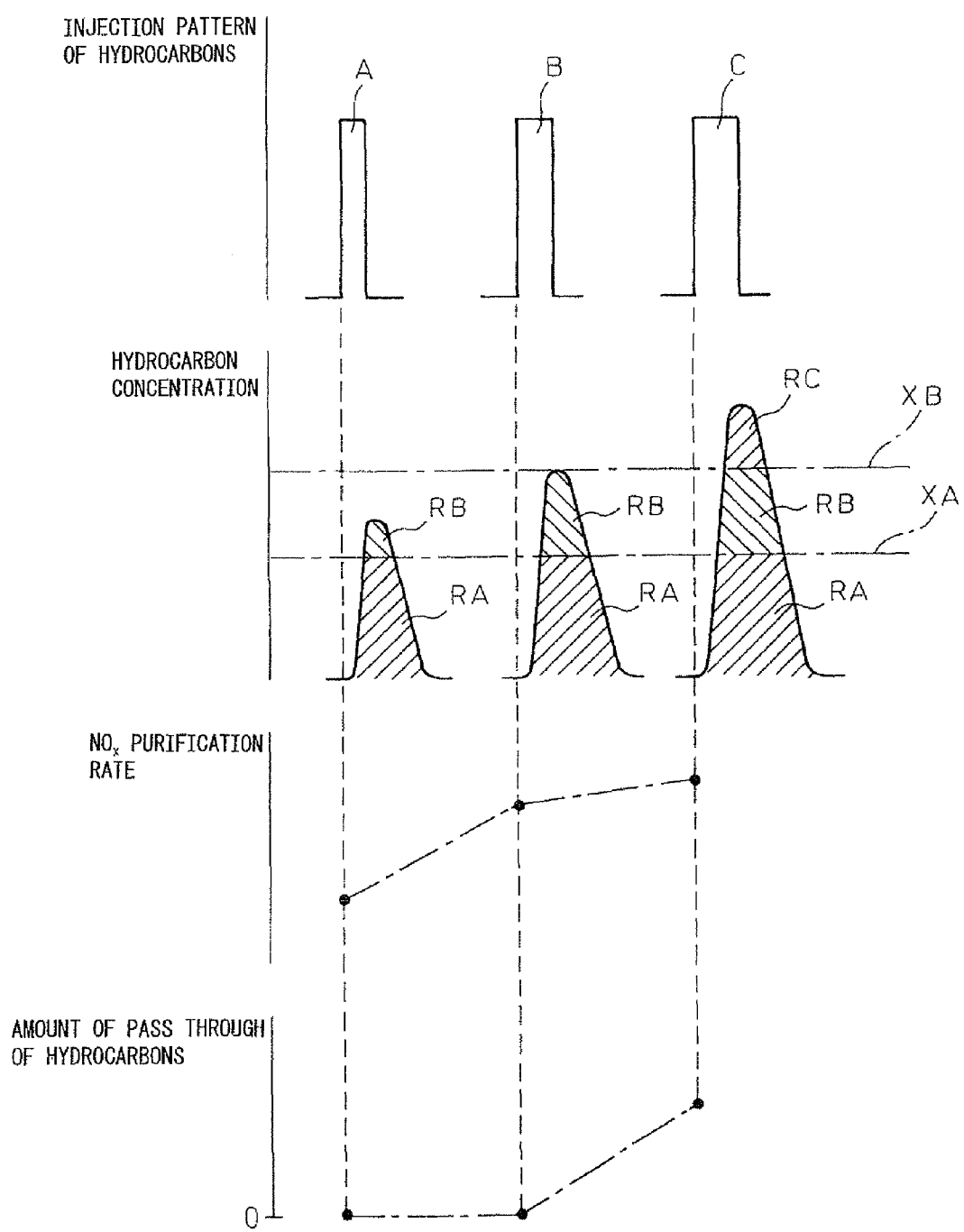
FIG. 20 is a view showing injection patterns of hydrocarbons from a hydrocarbon feed valve and changes in a hydrogen concentration in the exhaust gas flowing into the exhaust purification catalyst etc.

FIG. 20 shows the three injection patterns A, B, and C of hydrocarbons which are injected by different injection times from the hydrocarbon feed valve 15 under the same injection pressure. In this case, the injection time is the shortest in the injection pattern A and is longest in the injection pattern C. Further, FIG. 20 shows the hydrogen concentration in the exhaust gas which flows into the exhaust purification catalyst 13 after injection by the injection patterns A, B, and C. Furthermore, FIG. 20 shows the $NO_x$ purification rate and amount of hydrocarbons passing straight through the exhaust purification catalyst 13 at the time of injection by the injection patterns A, B, and C.

Now, when the hydrogen concentration in the exhaust gas which flows into the exhaust purification catalyst 13, that is, the amount of hydrocarbons per unit amount of exhaust gas is small, the hydrocarbons end up being completely oxidized at the exhaust purification catalyst 13. On the other hand, if the hydrogen concentration in the exhaust gas, that is, the amount of hydrocarbons per unit amount of exhaust gas increases, in the exhaust purification catalyst 13, all of the hydrocarbons can no longer be completely oxidized. At this time, part of the hydrocarbons is partially oxidized. In this way, in the hydrogen concentration in the exhaust gas, there is a limit up to where all of the hydrocarbons are completely oxidized in the exhaust purification catalyst 13. This limit is shown in FIG. 20 by XA.

That is, in FIG. 20, when the hydrocarbon concentration is lower than the limit XA, all of the hydrocarbons is completely oxidized, so in FIG. 20, in the hatching region RA below the limit XA, all of the hydrocarbons is completely oxidized. In this case, the area of the hatching region RA expresses the amount of hydrocarbons. Therefore, the amount of hydrocarbons corresponding to the hatching region RA is completely oxidized. Note that, below, this limit XA will be called the complete oxidation limit.

On the other hand, in FIG. 20, in the region RB above the complete oxidation limit XA, a partial oxidation action of hydrocarbons is performed in the exhaust purification catalyst 13. In this case, in FIG. 20, the hatching region RB expresses the amount of partially oxidized hydrocarbons. The reducing intermediate is produced from the partially oxidized hydrocarbons, so the $NO_x$ purification action is performed by the first $NO_x$ purification method by the partially oxidized hydrocarbon. Note that, in actuality, part of the partially oxidized hydrocarbons ends up being oxidized without being used for production of the reducing intermediate, while the remaining partially oxidized hydrocarbons are used to form the reducing intermediate.

On the other hand, if the hydrogen concentration in the exhaust gas which flows into the exhaust purification catalyst 13, that is, the amount of hydrocarbons per unit amount of exhaust gas, is further increased, part of the hydrocarbons is not completely oxidized in the exhaust purification catalyst 13 and further is not even partially oxidized. In this case, the part of the hydrocarbons not oxidized passes straight through the exhaust purification catalyst 13. This limit of hydrocarbons causing hydrocarbons to pass straight through is shown in FIG. 20 by XB. Below, this limit XB will be referred to as the pass through limit. In FIG. 20, the hatching region RC above this pass through limit XB expresses the amount of hydrocarbons passing straight through.

To remove $NO_x$ which is contained in exhaust gas using the first $NO_x$ purification method, it is necessary that a sufficient amount of hydrocarbons for the amount of $NO_x$ which is contained in the exhaust gas be partially oxidized. If the amount of partially oxidized hydrocarbons RB is insufficient, the $NO_x$ purification rate will fall. In FIG. 20, the injection pattern A shows the case where, in this way, the amount of partially oxidized hydrocarbons RB is insufficient. In this case, as shown in FIG. 20, the $NO_x$ purification rate will fall.

On the other hand, in FIG. 20, the injection pattern B shows the case where the injection time is made longer than in the injection pattern A so as to increase the amount of partially oxidized hydrocarbons RB. If the injection time is made longer, the amount of partially oxidized hydrocarbons RB is increased, so, as shown in FIG. 20, the $NO_x$ purification rate becomes higher. Note that, FIG. 20 shows the case where even with the injection pattern B, the amount of partially oxidized hydrocarbons RB is somewhat insufficient.

In FIG. 20, the injection pattern C shows the case where to further increase the amount of partially oxidized hydrocarbons RB, the injection time is made longer compared with the injection pattern B. In this case, as shown in FIG. 20, the $NO_x$ purification rate is improved. However, in this case, the hydrocarbon concentration exceeds the pass through limit XB, so the hydrocarbons pass straight through.

When performing the $NO_x$ purification action by the first $NO_x$ purification method, normally, it is necessary to prevent pass through of the hydrocarbons. Therefore, in the present invention, when performing the $NO_x$ purification action by the first $NO_x$ purification method, normally, in the example shown in FIG. 20, the injection pattern B by which the peak of the hydrocarbon concentration becomes the pass through limit XB is used. Of course, as shown in the injection pattern A, the injection pattern A is used when a sufficiently high $NO_x$ purification rate is obtained even if the peak of the hydrocarbon concentration does not reach the pass through limit XB. That is, in the present invention, then performing the $NO_x$ purification action by the first $NO_x$ purification method, normally the injection pattern A or the injection pattern B is used.

Now, if the temperature of the exhaust purification catalyst 13 rises, the amount of hydrocarbons which is oxidized at the exhaust purification catalyst 13 per unit time increases, that is, the oxidation speed at the hydrocarbons increases. As a result, if the temperature of the exhaust purification catalyst 13 rises, the complete oxidation limit XA rises. On the other hand, if the temperature of the exhaust purification catalyst 13 rises, the hydrocarbons which passed through before the temperature rose become partially oxidized, so the pass through limit XB also rises. That is, if the temperature of the exhaust purification catalyst 13 rises, both the complete oxidation limit XA and the pass through limit XB rise. Therefore, when using the first $NO_x$ purification method for removal of the $NO_x$, it is necessary to consider this for control of injection of the hydrocarbons.

Figure 21:
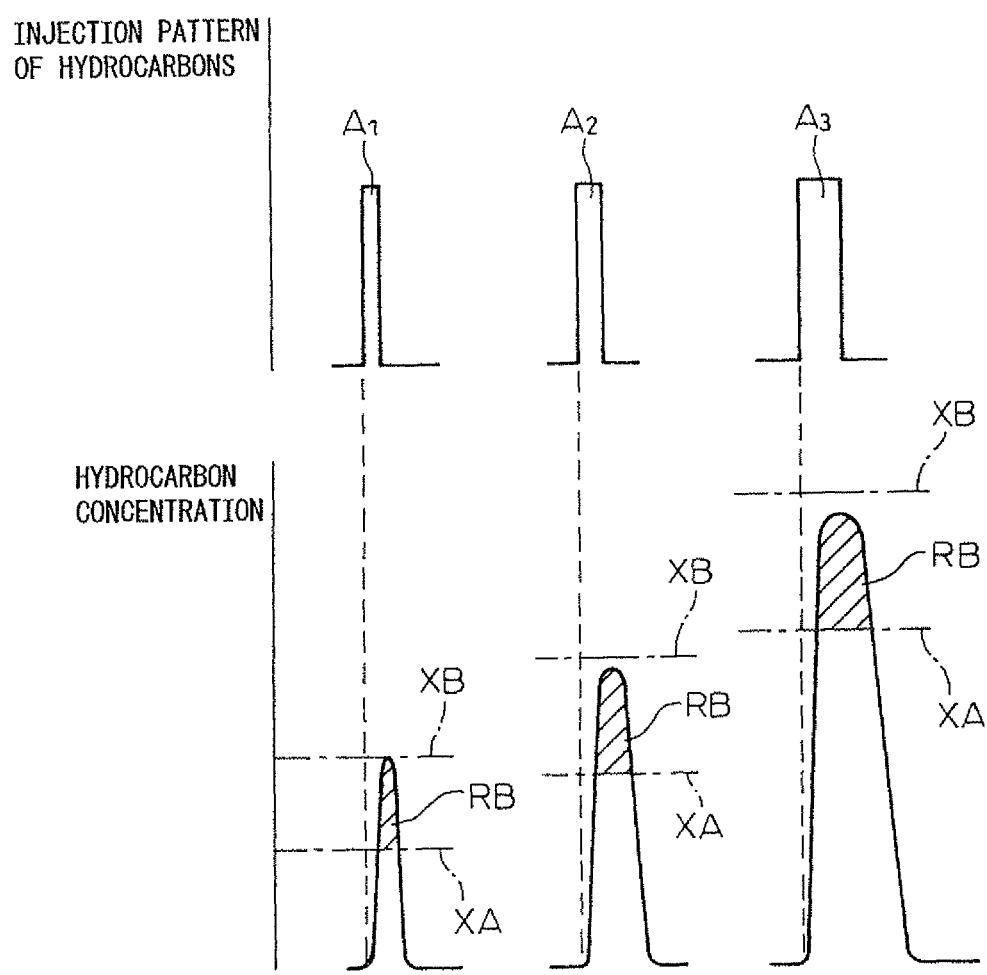
FIG. 21 is a view showing injection patterns of hydrocarbons from a hydrocarbon feed valve and a change in hydrogen concentration in the exhaust gas flowing into the exhaust purification catalyst.
Figure 22:
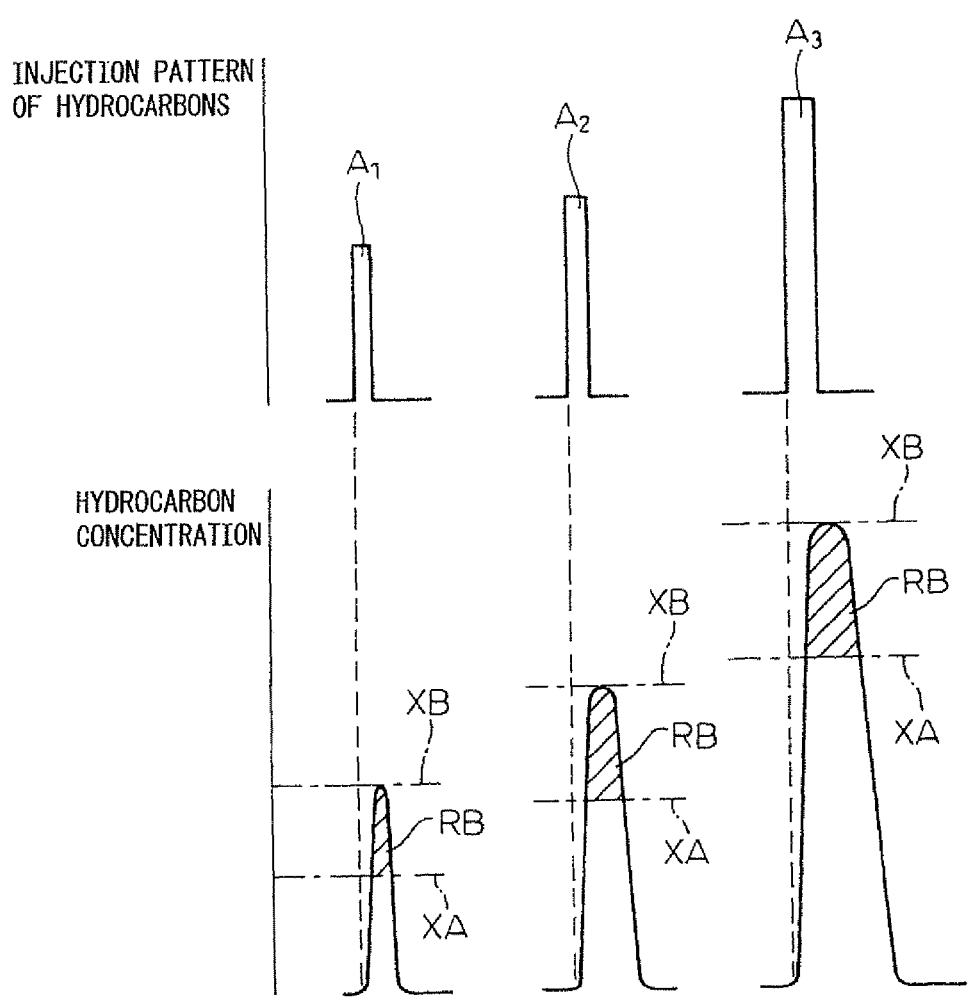
FIG. 22 is a view showing injection patterns of hydrocarbons from a hydrocarbon feed valve and a change in hydrogen concentration in the exhaust gas flowing into the exhaust purification catalyst.

FIG. 21 and FIG. 22 show one example when considering this for control of injection of hydrocarbons. Note that, the example shown in FIG. 21 shows the case where the injection pressure is maintained constant and the injection time is controlled in that state so as to control the injection amount of hydrocarbons, while the example shown in FIG. 22 shows the case where both the injection pressure and injection time are controlled so as to control the injection amount of hydrocarbons.

Further, in FIG. 21 and FIG. 22, $A_1$ shows the injection pattern when the engine speed and load are relatively low, $A_3$ shows the injection pattern when the engine speed and load are relatively high, and $A_2$ shows the injection pattern when the engine speed and load are respectively between the case shown by $A_1$ and the case shown by $A_3$. That is, as the engine speed and load become higher, the injection pattern is made to change from $A_1$ toward $A_3$.

Now, the higher the engine speed and load, the higher the temperature of the exhaust purification catalyst 13 becomes. Therefore, the higher the engine speed and load, the higher the complete oxidation limit XA and pass through limit XB as well. On the other hand, the higher the speed and load, the greater the $NO_x$ exhausted from the engine per unit time. Therefore, the higher the engine speed and load, the greater the amount RB of partially oxidized hydrocarbons has to be made. In this case, to make the amount RB of partially oxidized hydrocarbons increase, the injection amount of hydrocarbons has to be increased. Therefore, to enable the production of the amount of partially oxidized hydrocarbons required for removal of $NO_x$, in the example shown in FIG. 21, the higher the engine speed and load, the longer the injection time is made so as to make the injection amount increase, while in the example shown in FIG. 22, the higher the engine speed and load, the longer both the injection pressure and injection time are made so as to make the injection amount increase.

In this way, the injection amount can be controlled by controlling just the injection time or by controlling both the injection pressure and injection time, but below the case of controlling just the injection time so as to control the injection amount will be used as an example to explain the present invention.

Figure 23A:
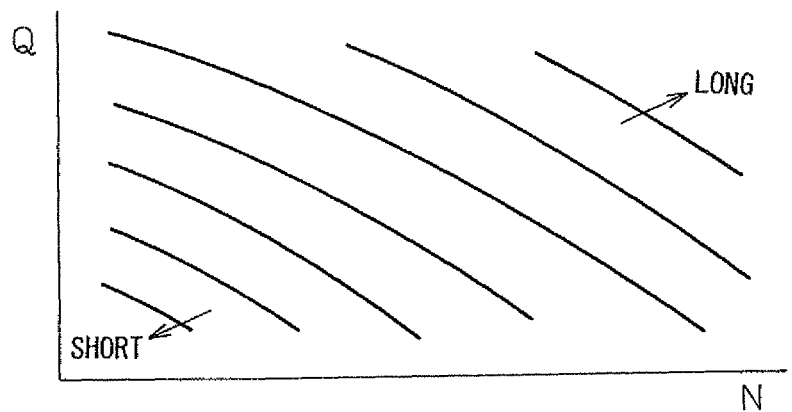
FIGS. 23A to 23C are views showing an injection time of hydrocarbons etc.
Figure 23B:
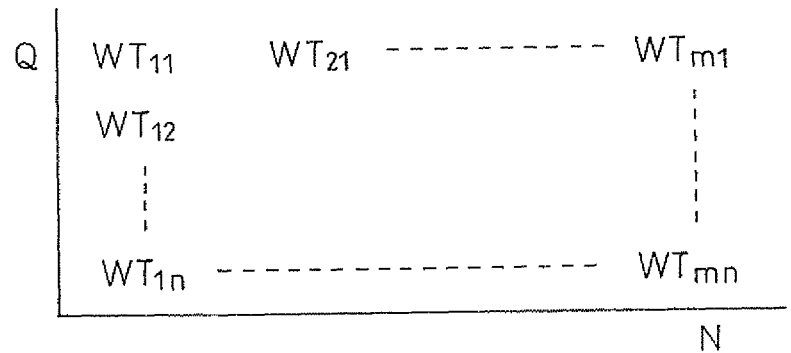

FIG. 23A shows the equivalent injection time line enabling the production of the amount of partially oxidized hydrocarbons required for removal of $NO_x$ when controlling just the injection time to control the injection amount in this way. As will be understood from FIG. 23A, the injection time of hydrocarbons becomes longer the greater fuel injection amount Q to the inside of the combustion chamber 2, that is, the greater the engine load, and the higher the engine speed N. This injection time WT is stored as a function of the fuel injection amount Q and engine speed N in the form of a map as shown in FIG. 23B in advance in the ROM 32. Further, the optimum vibration amplitude ΔT of the hydrocarbon concentration, that is, the injection period ΔT of the hydrocarbons, is similarly stored as a function of the injection amount Q and engine speed N in the form of a map as shown in FIG. 23C in advance in the ROM 32.

Figure 23C:
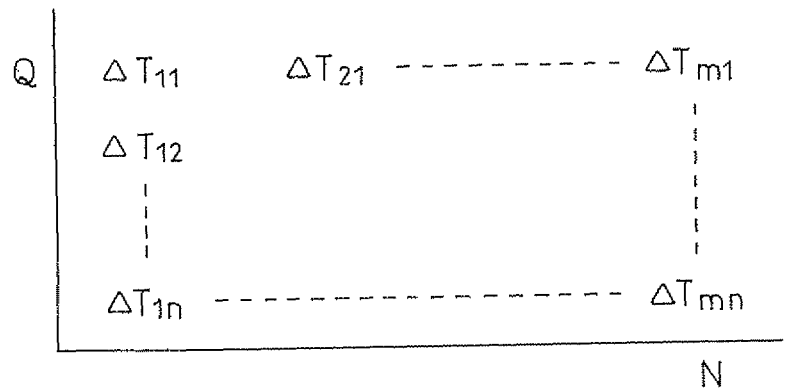
Figure 24:
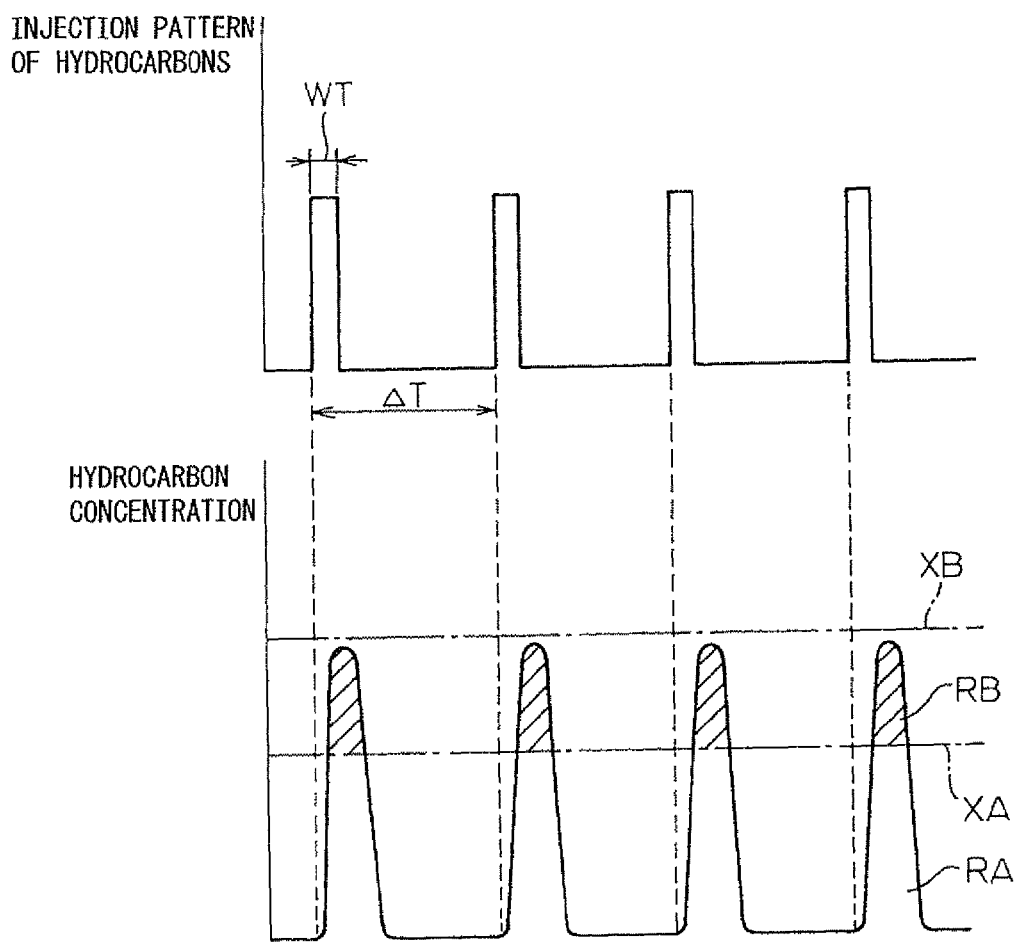
FIG. 24 is a view showing injection patterns of hydrocarbons from a hydrocarbon feed valve and a change in hydrogen concentration in the exhaust gas flowing into the exhaust purification catalyst.

At the time of engine operation, if hydrocarbons are injected from the hydrocarbon feed valve 15 by the injection time WTij shown in FIG. 23B and the injection period ΔTij shown in FIG. 23C, a good $NO_x$ purification action by the first $NO_x$ purification method is performed. FIG. 24 shows the injection pattern of hydrocarbons and the change in the hydrocarbon concentration at the time when a good $NO_x$ purification action by the first $NO_x$ purification method is performed in this way. At this time, the amount of hydrocarbons shown in the region RA in FIG. 24 is made to completely oxidize. At this time, due to the heat of oxidation reaction of the hydrocarbons, the exhaust purification catalyst 13 is maintained in the activated state.

Now then, when the exhaust purification catalyst 13 is activated and the $NO_x$ purification action is being performed by the first $NO_x$ purification method, as explained above, nitrates are either not produced or else even if produced are very slight in amount, therefore at this time the exhaust purification catalyst 13 does not store much $NO_x$ at all. On the other hand, when the exhaust purification catalyst 13 is not activated, the $NO_x$ purification action cannot be performed by first $NO_x$ purification method. At this time, the $NO_x$ which is contained in the exhaust gas is stored in the exhaust purification catalyst 13. Therefore, at the time of engine operation, at least before the exhaust purification catalyst 13 is activated, some $NO_x$ is stored in the exhaust purification catalyst 13.

This stored $NO_x$, as explained above, can be educed using the second $NO_x$ purification method. However, the inventors engaged in repeated research and as a result found that this stored $NO_x$ can be reduced even if using a third $NO_x$ purification method separate from the second $NO_x$ purification method. Next, while referring to FIGS. 25A, 25B, and 26, the $NO_x$ purification action by this third $NO_x$ purification method will be explained.

Figure 25A:
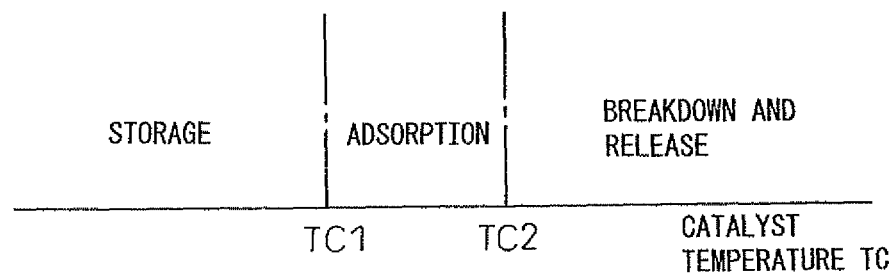
FIGS. 25A and 25B are views for explaining the behavior of stored $NO_x$.
Figure 25B:
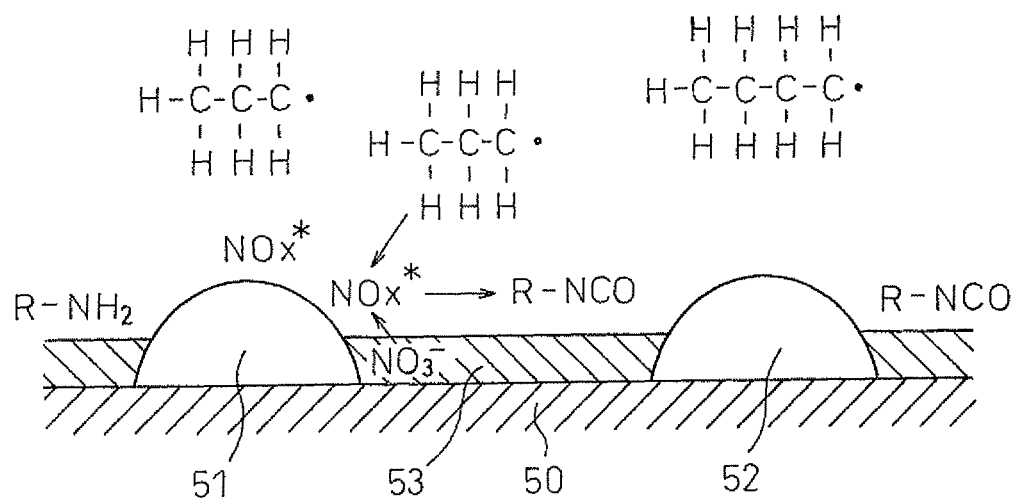

FIG. 25A shows the behavior of the $NO_x$ which is stored in the exhaust purification catalyst 13. In FIG. 25A, TC1 and TC2 indicate the temperatures of the exhaust purification catalyst 13. The $NO_x$ which is stored in the exhaust purification catalyst 13 is held in the state stored in the exhaust purification catalyst 13 when the temperature TC of the exhaust purification catalyst 13 is lower than TC1. As opposed to this, if the temperature TC of the exhaust purification catalyst 13 exceeds TC1 and, as shown in FIG. 25B, hydrocarbons are present in the surroundings, the nitrates which are stored in the basic layer 53 become nitrate ions $NO_3^-$ which are then released from the basic layer 53, become active $NO_x^*$, and are adsorbed on the surface of the exhaust purification catalyst 13. Therefore, TC1 shows the $NO_x$ release temperature at which the stored $NO_x$ is released.

Next, this active $NO_x^*$ reacts with the radicalized hydrocarbons HC on the platinum 51 whereby a reducing intermediate is produced. Next, this reducing intermediate, as shown in FIG. 6A, reacts with the active $NO_x^*$ to be removed. The $NO_x$ purification method which produces a reducing intermediate from the stored $NO_x$ in this way and uses this to remove the $NO_x$ is the above third $NO_x$ purification method.

Therefore, in the present invention, to use the third $NO_x$ purification method to remove $NO_x$, at the time of engine operation, when $NO_x$ is stored in the exhaust purification catalyst 13, the injection amount of hydrocarbons from the hydrocarbon feed valve 15 is controlled so that the amplitude of the change of concentration of hydrocarbons flowing into the exhaust purification catalyst 13 becomes within a predetermined range of amplitude, the injection period of hydrocarbons from the hydrocarbon feed valve 15 is controlled so that the concentration of hydrocarbons flowing into the exhaust purification catalyst 13 vibrates by a predetermined range of period, and thereby the $NO_x$ which is contained in the exhaust gas and the $NO_x$ which is stored in the exhaust purification catalyst 13 are reduced.

In this case, in the present invention, inside the exhaust purification catalyst 13, the $NO_x$ contained in the exhaust gas and the $NO_x$ stored in the exhaust purification catalyst 13 react with the reformed hydrocarbons whereby a reducing intermediate which contains nitrogen and hydrocarbons is produced. The injection period of the hydrocarbons from the hydrocarbon feed valve 15 is made the period which is required for continued production of the reducing intermediate. In the present invention, the injection period of the hydrocarbons is from 0.3 second to 5 seconds.

On the other hand, if the temperature TC of the exhaust purification catalyst 13 exceeds TC2 and, as shown in FIG. 25B, there are hydrocarbons in the surroundings, the nitrates which are stored in the basic layer 53 are broken down and $NO_x$ is released from inside the basic layer 53. Therefore, TC2 shows the boundary temperature at which the released stored $NO_x$ is either held in the adsorbed state or the nitrates are broken down and $NO_x$ is released. When the nitrates are broken down and $NO_x$ is released, no reducing intermediate is produced. In this case, no $NO_x$ purification action by the third $NO_x$ purification method is performed. Therefore, the $NO_x$ purification action can be performed by third $NO_x$ purification method when the temperature TC of the exhaust purification catalyst 13 is between the $NO_x$ release temperature TC1 and the boundary temperature TC2.

Figure 26:
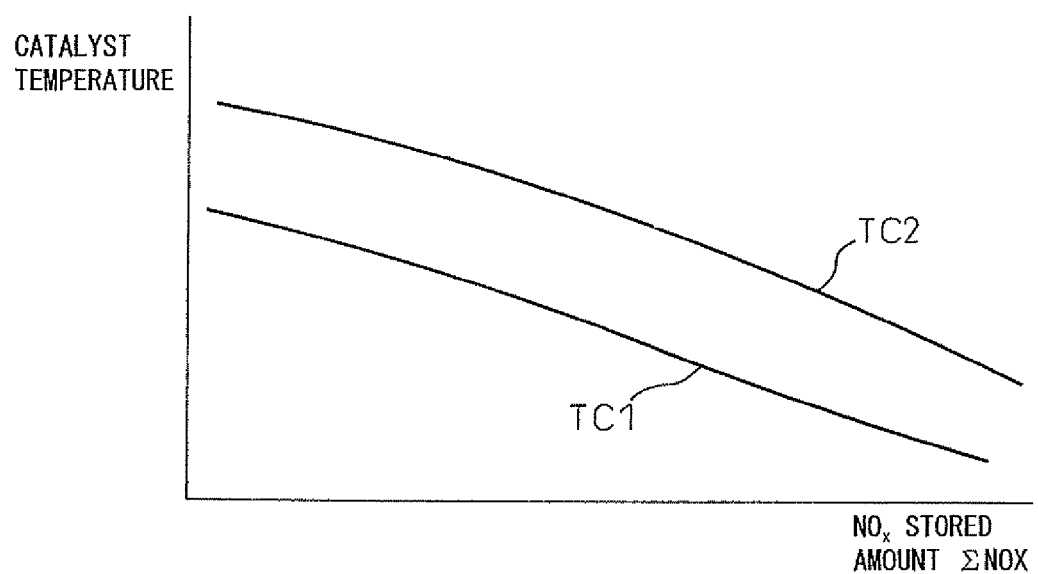
FIG. 26 is a view showing an $NO_x$ release temperature TC1 and a boundary temperature TC2.

Note that, in this case, the $NO_x$ release temperature TC1 and boundary temperature TC2 are functions of the $NO_x$ stored amount ΣNOX stored in the exhaust purification catalyst 13. As shown in FIG. 26, these $NO_x$ release temperature TC1 and boundary temperature TC2 gradually become lower as the $NO_x$ stored amount ΣNOX increases. That is, it is learned that the range of the temperature of the exhaust purification catalyst 13 where an $NO_x$ purification action can be performed by the third $NO_x$ purification method becomes lower the greater the $NO_x$ stored amount ΣNOX. This range of the temperature of the exhaust purification catalyst 13 where an $NO_x$ purification action can be performed by the third $NO_x$ purification method is found in advance by experiments.

Now then, if the exhaust purification catalyst 13 is activated and the $NO_x$ purification action is started by the first $NO_x$ purification method, the heat of the oxidation reaction of the fed hydrocarbons causes the temperature of the exhaust purification catalyst 13 to rise. At this time, if the temperature of the exhaust purification catalyst 13 rises to between the $NO_x$ release temperature TC1 and the boundary temperature TC2 and there are hydrocarbons in the surroundings at this time, the $NO_x$ which is released from the exhaust purification catalyst 13 can be removed by the $NO_x$ purification action by the third $NO_x$ purification method. In this case, in addition to the $NO_x$ which is contained in the exhaust gas, it is necessary to reduce the $NO_x$ which is released from the exhaust purification catalyst 13, so the amount of hydrocarbons which is fed from the hydrocarbon feed valve 15 is made to increase compared with the case where the $NO_x$ purification action is performed by the first $NO_x$ purification method.

Figure 27:
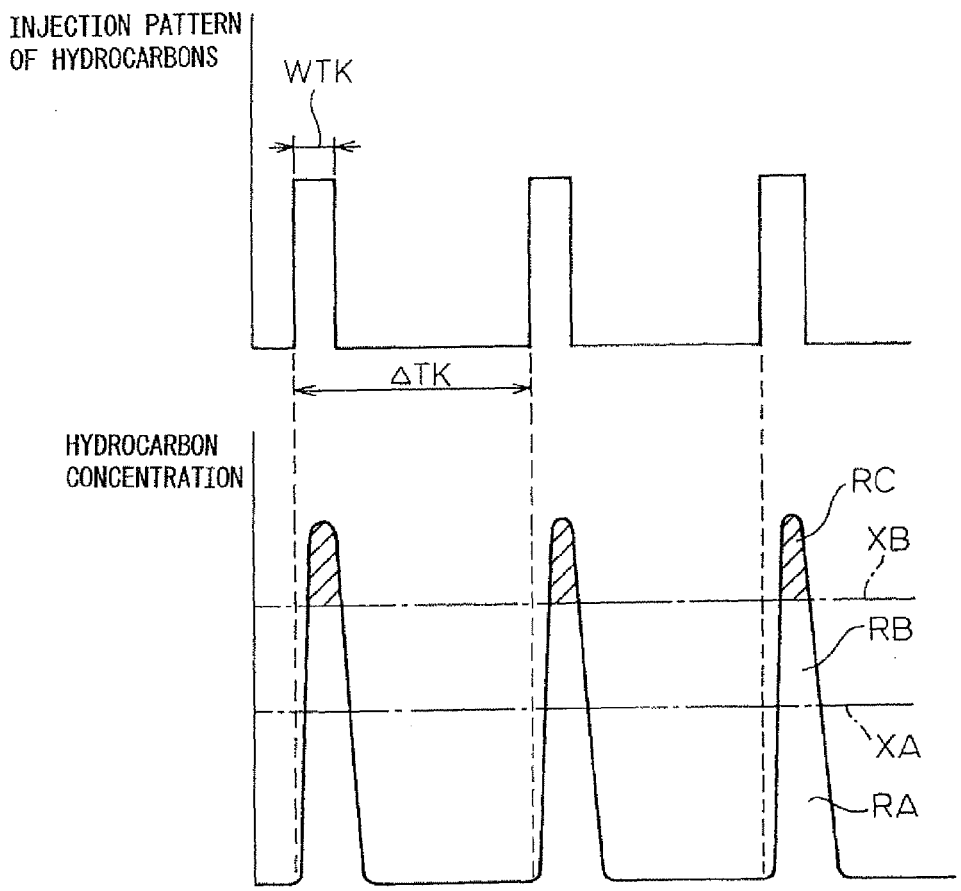
FIG. 27 is a view showing injection patterns of hydrocarbons from a hydrocarbon feed valve and a change in hydrogen concentration in the exhaust gas flowing into the exhaust purification catalyst.

FIG. 27 shows the injection patterns of hydrocarbons and a change in hydrogen concentration when performing an $NO_x$ purification action by the third $NO_x$ purification method. In FIG. 27, as shown by WTK, it is learned that the injection time when performing an $NO_x$ purification action by the third $NO_x$ purification method is made longer compared with the injection time TW (FIG. 24) when performing an $NO_x$ purification action by the first $NO_x$ purification method, and thereby the injection amount is increased. If the injection amount is increased in this way, in addition to the $NO_x$ which is contained in the exhaust gas, the $NO_x$ which was stored in the exhaust purification catalyst 13 is reduced. Therefore, a good $NO_x$ purification action is performed by the third $NO_x$ purification method.

Further, if the injection amount is increased, the amount RA of hydrocarbons which is completely oxidized at the exhaust purification catalyst 13 is increased, so the heat of oxidation reaction is increased and, as a result, the temperature of the exhaust purification catalyst 13 rises. However, at this time, the exhaust purification catalyst 13 itself does not particularly have to be raised in temperature. The temperature of the exhaust purification catalyst 13 need only be maintained at the temperature at that time. In this case, to maintain the temperature of the exhaust purification catalyst 13 as it is, it is necessary to maintain the amount of hydrocarbons which is completely oxidized per unit time constant.

The amount of hydrocarbons which is completely oxidized per unit time can be expressed by the value (RA/ΔTK) of the amount RA of hydrocarbons completely oxidized per injection divided by the injection period ΔTK. In this case, the amount RA of hydrocarbons completely oxidized per injection is proportional to the injection amount, while the injection amount is proportional to the injection time WTK, so the amount of hydrocarbons completely oxidized per unit time can be expressed by the value (WTK/ΔTK) of the injection time WTK divided by the injection period ΔTK. Therefore, to maintain the temperature of the exhaust purification catalyst 13 as it is, it is sufficient to make this value (WTK/ΔTK) equal to the (WT/ΔT) of the case shown in FIG. 24.

Figure 28:
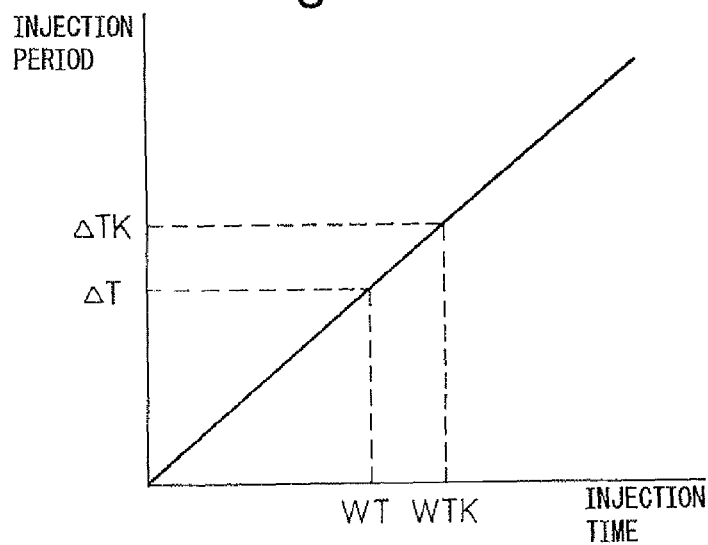
FIG. 28 is a view showing a relationship of an injection time and injection period of hydrocarbons.

The relationship when (WTK/ΔTK)=(WT/ΔT) is shown in FIG. 28. As will be understood from FIG. 28, to maintain the temperature of the exhaust purification catalyst 13 as it is, it is necessary to increase the injection period from ΔT to ΔTK when the injection time is increased from WT to WTK. That is, in this embodiment according to the present invention, the injection period of the hydrocarbons is made longer the more the injection amount of hydrocarbons increases.

Note that, as shown in FIG. 26, when the $NO_x$ stored amount ΣNOX is large, the boundary temperature TC2 is low. In actuality, at this time, if the exhaust purification catalyst 13 is activated and the $NO_x$ purification action is started by the first $NO_x$ purification method, the temperature of the exhaust purification catalyst 13 will often end up exceeding the boundary temperature TC2. Therefore, when in actuality the $NO_x$ purification action is started by the first $NO_x$ purification method, the $NO_x$ purification action can be performed by the third $NO_x$ purification method only when the $NO_x$ stored amount ΣNOX is small.

On the other hand, when the $NO_x$ purification action is started by the first $NO_x$ purification method and the temperature of the exhaust purification catalyst 13 exceeds the boundary temperature TC2, as explained above, the nitrates which are stored in the exhaust purification catalyst 13 are broken down and $NO_x$ is released from the exhaust purification catalyst 13. If $NO_x$ is released from the exhaust purification catalyst 13 in this way, this $NO_x$ ends up being exhausted into the outside air without being reduced. Therefore, to reduce the $NO_x$ which is released at this time, the air-fuel ratio of the exhaust gas which flows into the exhaust purification catalyst 13 is temporarily made rich. That is, at this time, the $NO_x$ purification action by the second $NO_x$ purification method is used for removal of $NO_x$.

In this way, in the present invention, at the time of engine operation, the first $NO_x$ purification method which makes the concentration of hydrocarbons which flow into the exhaust purification catalyst 13 vibrate by within a predetermined range of amplitude and within a predetermined range of period so as to reduce the $NO_x$ which is contained in the exhaust gas, the second $NO_x$ purification method which makes the concentration of hydrocarbons which flow into the exhaust purification catalyst 13 larger than within the predetermined range of amplitude to thereby make the exhaust purification catalyst 13 release the stored $NO_x$, and the third $NO_x$ purification method which makes the concentration of hydrocarbons which flow into the exhaust purification catalyst 13 vibrate by within a predetermined range of amplitude and within a predetermined range of period so as to reduce the $NO_x$ contained in the exhaust gas and the $NO_x$ stored in the exhaust purification catalyst 13 together are selectively used in accordance with the operating state of the engine.

In this case, in the present invention, if $NO_x$ is stored in the exhaust purification catalyst when the exhaust purification catalyst is activated and the $NO_x$ purification action is started by the first $NO_x$ purification method, either the $NO_x$ purification action by the second $NO_x$ purification method or the $NO_x$ purification action by the third $NO_x$ purification method is performed.

In this case, as explained above, the $NO_x$ purification action by the third $NO_x$ purification method can be performed when the temperature of the exhaust purification catalyst 13 is within the predetermined temperature range. This temperature range decreases as the $NO_x$ stored amount which is stored in the exhaust purification catalyst 13 increases.

Further, as explained above, it is actually possible to perform the $NO_x$ purification action by the third $NO_x$ purification method when the $NO_x$ stored amount ΣNOX is small. Therefore, in one embodiment of the present invention, the $NO_x$ purification action by the third $NO_x$ purification method is performed when the $NO_x$ stored amount which is stored in the exhaust purification catalyst 13 is lower than a predetermined set value.

Figure 29:
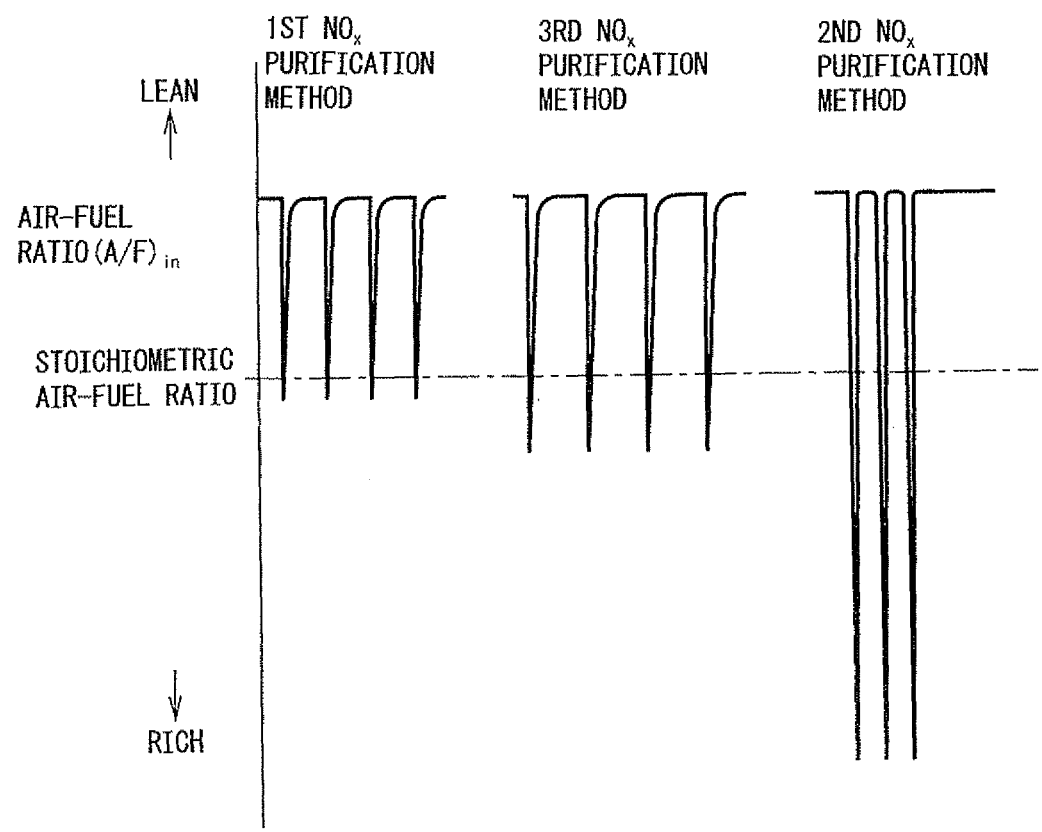
FIG. 29 is a view showing changes in an air-fuel ratio of exhaust gas flowing into the exhaust purification catalyst.

FIG. 29 shows the differences in changes of the air-fuel ratio of the exhaust gas which flows into the exhaust purification catalyst 13 under the same engine operating conditions when the $NO_x$ purification action is performed by the first $NO_x$ purification method, the $NO_x$ purification action is performed by the second $NO_x$ purification method, and the $NO_x$ purification action is performed by the third $NO_x$ purification method.

Figure 30:
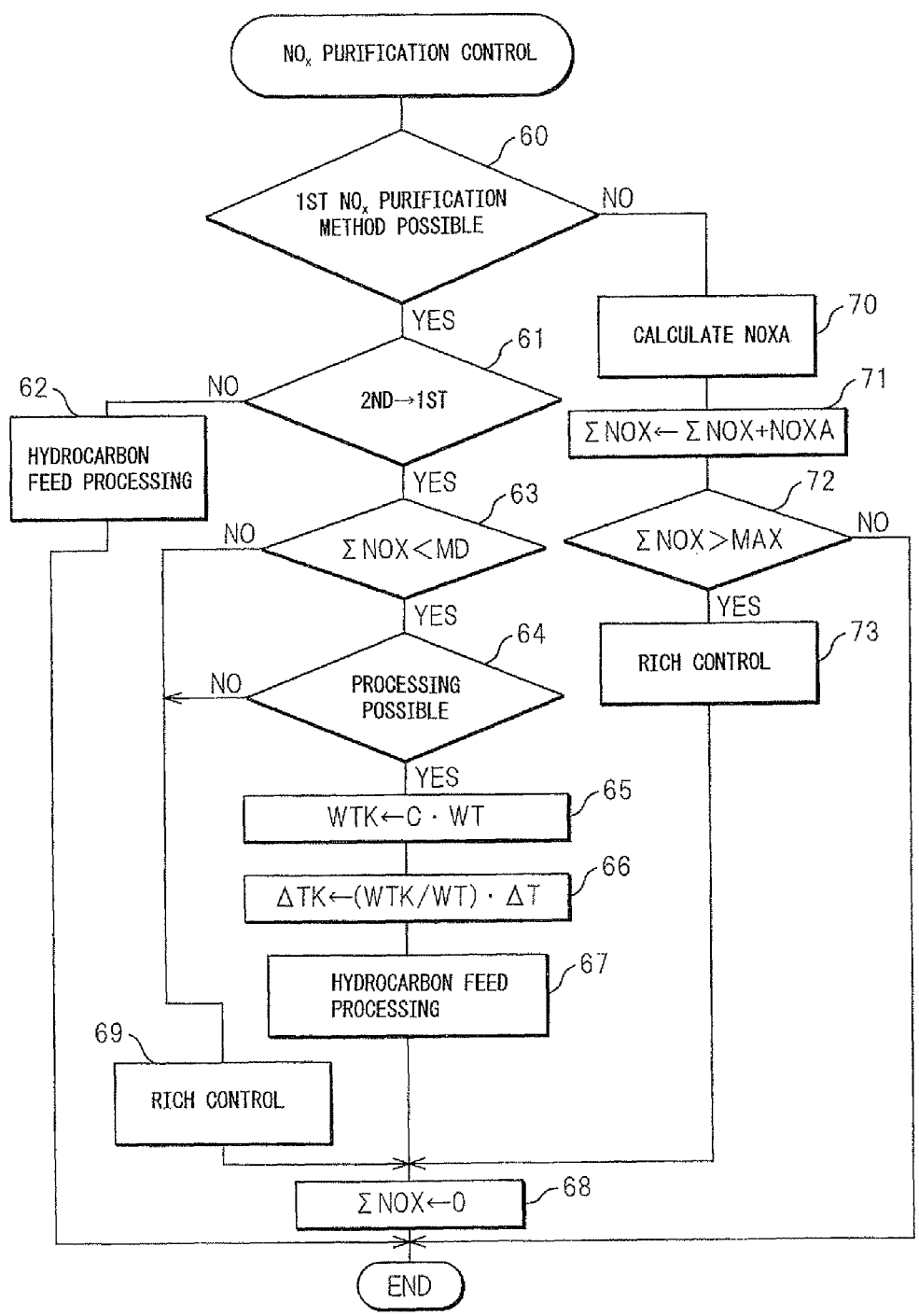
FIG. 30 is a flow chart for $NO_x$ purification control.

FIG. 30 shows the $NO_x$ purification control routine. This routine is executed by interruption every predetermined time interval.

Referring to FIG. 30, first, at step 60, it is judged if the $NO_x$ purification action by the first $NO_x$ purification method is possible. For example, when it is judged from the output signal of the temperature sensor 23 that the temperature TC of the exhaust purification catalyst 13 exceeds the activation temperature, it is judged that the $NO_x$ purification action by the first $NO_x$ purification method is possible. When it is judged at step 61 that the $NO_x$ purification action by the first $NO_x$ purification method is possible, the routine proceeds to step 61 where it is judged if the $NO_x$ purification processing by the second NO purification method has been switched to the $NO_x$ purification processing by the first $NO_x$ purification method now.

When the $NO_x$ purification processing by the second $NO_x$ purification method has not been switched to the $NO_x$ purification processing by the first $NO_x$ purification method now, that is, when the $NO_x$ purification processing was performed by the first $NO_x$ purification method even at the time of the previous interruption, the routine proceeds to step 62 where processing is performed for feeding hydrocarbons by the injection time WTij which is calculated from FIG. 23B and the injection period $\Delta$Tij which is calculated from FIG. 23C. At this time, the $NO_x$ purification action by the first $NO_x$ purification method is performed.

On the other hand, when it is judged at step 60 that the $NO_x$ purification action by the first $NO_x$ purification method is not possible, for example, when like at the time of engine startup the temperature of the exhaust purification catalyst 13 has not reached the activation temperature, it is judged that the second $NO_x$ purification method should be used, the routine proceeds to step 70. At step 70, the $NO_x$ amount NOXA which is exhausted per unit time is calculated from the map shown in FIG. 17. Next, at step 71, $\Sigma$NOX is increased by the exhausted $NO_x$ amount NOXA whereby the stored $NO_x$ amount $\Sigma$NOX is calculated. Next, at step 72, it is judged if the stored $NO_x$ amount $\Sigma$NOX exceeds the allowable value MAX. When $\Sigma$NOX>MAX, the routine proceeds to step 73 where the additional fuel amount WR is calculated from the map shown in FIG. 19 and an additional fuel injection action is performed. Next, at step 68, $\Sigma$NOX is cleared.

On the other hand, when it is judged at step 61 that the $NO_x$ purification processing by the second $NO_x$ purification method is switched to the $NO_x$ purification processing by the first $NO_x$ purification method now, the routine proceeds to step 63 where it is judged if the $NO_x$ stored amount $\Sigma$NOX is smaller than a predetermined set value MD. When $\Sigma$NOX<MD, the routine proceeds to step 64 where it is judged if the $NO_x$ purification processing by the third $NO_x$ purification method is possible, that is, if the temperature TC of the exhaust purification catalyst 13 is between the $NO_x$ release temperature TC1 and the boundary temperature TC2. When the $NO_x$ purification processing by the third $NO_x$ purification method is possible, the routine proceeds to step 65 where the $NO_x$ purification processing is performed by the third $NO_x$ purification method. Note that it is possible to omit either of step 63 or step 64.

At step 65, the injection time WT which is calculated from the map which is shown in FIG. 23B in accordance with the operating conditions is multiplied with a predetermined constant C whereby the injection time WTK is calculated. Next, at step 66, the following formula is used as the basis to calculate the injection period $\Delta$TK of hydrocarbons at the time of $NO_x$ purification processing by the third $NO_x$ purification method.

$$\Delta TK \leftarrow (WTK/WT) \cdot \Delta T$$

Next, at step 67, processing is performed for feeding hydrocarbons by the injection time WTK which was calculated at step 65 and the injection period $\Delta$TK which was calculated at step 66. At this time, the $NO_x$ purification action by the third $NO_x$ purification method is performed. Next, the routine proceeds to step 68.

On the other hand, when it is judged at step 63 that the $NO_x$ stored amount $\Sigma$NOX is greater than the predetermined set value MD or when it is judged at step 64 that $NO_x$ purification processing by the third $NO_x$ purification method is not possible, the routine proceeds to step 69 where the air-fuel ratio of the exhaust gas which flows into the exhaust purification catalyst 13 is temporarily made rich. That is, at this time, the $NO_x$ is removed using the $NO_x$ purification action by the second $NO_x$ purification method. Next, the routine proceeds to step 68.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
    a hydrocarbon feed valve for feeding hydrocarbons-is arranged inside of an engine exhaust passage,
    an exhaust purification catalyst for reacting $NO_x$ contained in exhaust gas and reformed hydrocarbons arranged inside of the engine exhaust passage and downstream of the hydrocarbon feed valve,
    a precious metal catalyst carried on an exhaust gas flow surface of the exhaust purification catalyst,
    a basic exhaust gas flow surface part formed around the precious metal catalyst, and
    an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
        when the electronic control unit controls the vibration of the concentration of hydrocarbons flowing into the exhaust purification catalyst within the predetermined range of amplitude and within the predetermined range of period, the exhaust purification catalyst has a property of chemically reducing the $NO_x$ that is contained in exhaust gas without storing, or storing a fine amount of nitrates in the exhaust purification catalyst, and when the electronic control unit controls the vibration period of the hydrocarbon concentration longer than the predetermined range, the exhaust purification catalyst has a property of being increased in a storage amount of $NO_x$, and at the time of engine operation, when $NO_x$ is stored in the exhaust purification catalyst, the electronic control unit is further configured to optionally control an injection amount and an injection period of hydrocarbons from the hydrocarbon feed valve so that the amplitude of the change of concentration of hydrocarbons flowing into the exhaust purification catalyst comes within the predetermined range of amplitude, and vibrates within the predetermined range of period, thereby the $NO_x$ that is contained in the exhaust gas and the $NO_x$ that is stored in the exhaust purification catalyst are chemically reduced.

2. The exhaust purification system of an internal combustion engine as claimed in claim 1, wherein, inside the exhaust purification catalyst, the $NO_x$ contained in the exhaust gas and the $NO_x$ stored in the exhaust purification catalyst react with the reformed hydrocarbons producing a reducing intermediate that contains nitrogen and hydrocarbons, and wherein the injection period of the hydrocarbons is the period that is required for continued production of the reducing intermediate.

3. The exhaust purification system of an internal combustion engine as claimed in claim 2, wherein the injection period of hydrocarbons is 0.3 second to 5 seconds.

4. The exhaust purification system of an internal combustion engine as claimed in claim 1, wherein, at the time of engine operation, a first configuration of the electronic control unit controls the concentration of hydrocarbons that flow into the exhaust purification catalyst such that the concentration of hydrocarbons vibrates within the predetermined range of amplitude and within the predetermined range of period to chemically reduce the $NO_x$ contained in the exhaust gas, a second configuration of the electronic control unit controls the concentration of hydrocarbons that flow into the exhaust purification catalyst larger than the predetermined range of amplitude, which causes the exhaust purification catalyst to release and chemically reduce stored $NO_x$ and a third configuration of the electronic control unit controls the concentration of hydrocarbons that flow into the exhaust purification catalyst such that the concentration of hydrocarbons vibrate within the predetermined range of amplitude and within the predetermined range of period to chemically reduce the $NO_x$ contained in the exhaust gas and the $NO_x$ stored in the exhaust purification catalyst together are selectively used in accordance with an operating state of the engine.

5. The exhaust purification system of an internal combustion engine as claimed in claim 4, wherein, if $NO_x$ is stored in the exhaust purification catalyst when the exhaust purification catalyst is activated and the electronic control unit is in the first configuration, the electronic control unit changes to either the second configuration or the third configuration.

6. The exhaust purification system of an internal combustion engine as claimed in claim 4, wherein when a temperature of the exhaust purification catalyst is within a predetermined temperature range, the electronic control unit is in the third configuration, and wherein the predetermined temperature range decreases as an amount of $NO_x$ that is stored in the exhaust purification catalyst increases.

7. The exhaust purification system of an internal combustion engine as claimed in claim 4, wherein when an amount of $NO_x$ that is stored in the exhaust purification catalyst is lower than a predetermined set value, the electronic control unit is in the third configuration.

8. The exhaust purification system of an internal combustion engine as claimed in claim 4, wherein when the electronic control unit is in the third configuration, the amplitude of the change of the concentration of hydrocarbons flowing into the exhaust purification catalyst is increased compared to when the electronic control unit is in the first configuration.

9. The exhaust purification system of an internal combustion engine as claimed in claim 1, wherein the precious metal catalyst is comprised of platinum Pt and at least one of rhodium Rh or palladium Pd.

10. The exhaust purification system of an internal combustion engine as claimed in claim 1, wherein a basic layer containing an alkali metal, an alkali earth metal, a rare earth, or a metal that can donate electrons to $NO_x$ is formed on the exhaust gas flow surface of the exhaust purification catalyst, and wherein a surface of the basic layer forms the basic exhaust gas flow surface part.

11. The exhaust purification system of an internal combustion engine as claimed in claim 2, wherein the reducing intermediate is held on the basic exhaust gas flow surface part, and the $NO_x$ contained in the exhaust gas is chemically reduced by the reducing intermediate held on the basic exhaust gas flow surface part.

* * * * *